UNITED STATES PATENT OFFICE.

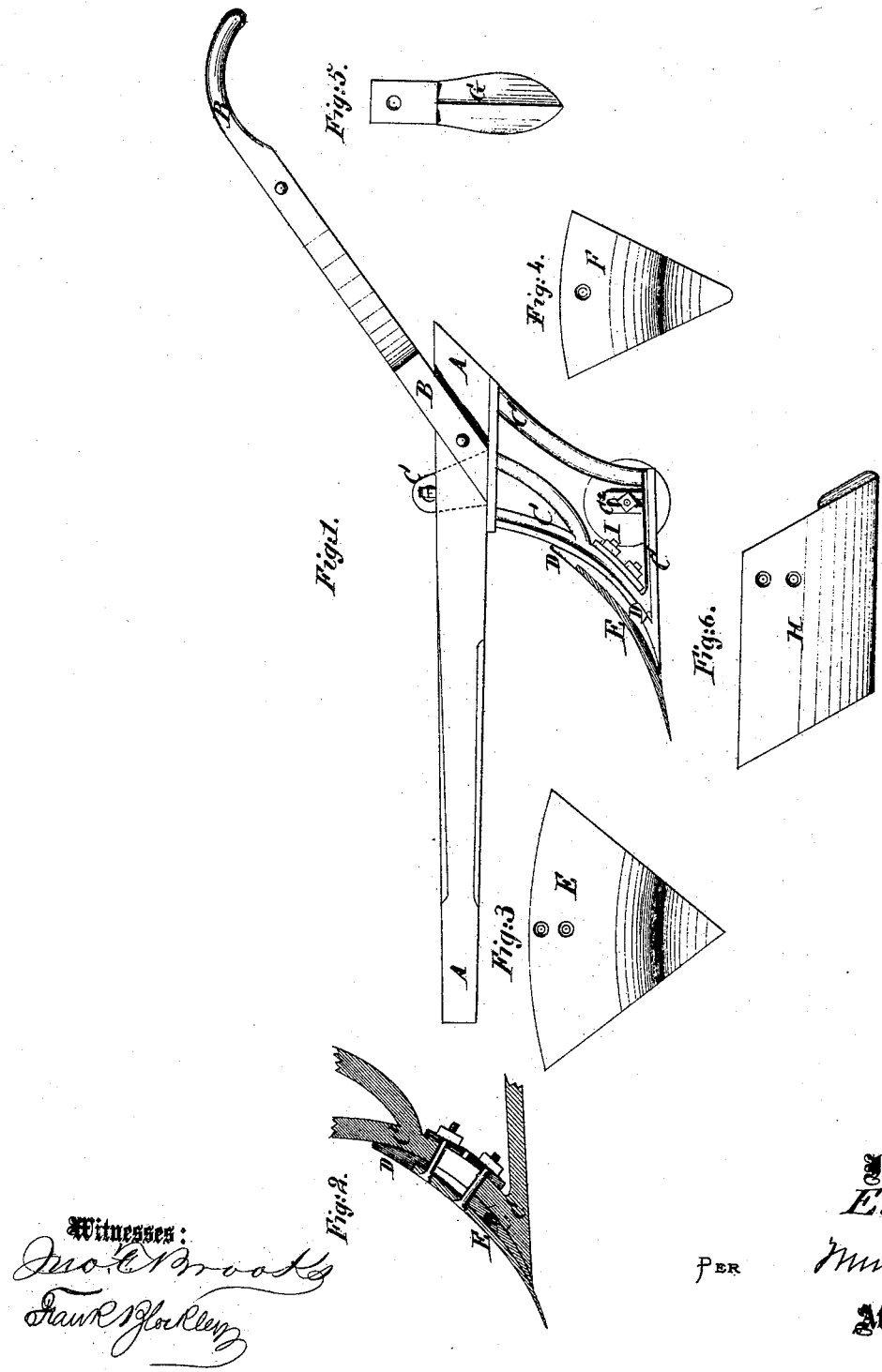

EDWARD WIARD, OF LOUISVILLE, KENTUCKY, ASSIGNOR TO B. F. AVERY, OF SAME PLACE.

IMPROVEMENT IN PLOWS.

Specification forming part of Letters Patent No. 94,366, dated August 31, 1869.

*To all whom it may concern:*

Be it known that I, EDWARD WIARD, of Louisville, in the county of Jefferson and State of Kentucky, have invented a new and useful Improvement in Plows; and I do hereby declare that the following is a full, clear, and exact description thereof, which will enable others skilled in the art to make and use the same, reference being had to the accompanying drawings, forming part of this specification, in which—

Figure 1 is a side view of my improved plow, partly in section, to show the construction. Fig. 2 is a detail sectional view of the same. Figs. 3, 4, 5, 6 are detail views of various kinds of plow-plates.

Similar letters of reference indicate corresponding parts.

My invention has for its object to furnish an improved plow which shall be so constructed and arranged that various kinds of plow-plates may be used with it, according to the particular kind of plowing required to be done; and it consists in the construction and combination of various parts of the plow as hereinafter more fully described.

A is the plow-beam, to the rear part of which the handles B are securely attached.

C is the skeleton standard-frame, upon the forward part of the top-bar of which is formed a lug, $c'$, which passes through the beam A, and is secured by a key in the ordinary manner.

Upon the lower part of the curved front bar of the frame C is fitted a shoe or plow-plate seat, D, having lugs or flanges upon its rear edges, which keep it securely in place upon the said standard or frame. The seat D is slotted longitudinally to receive the bolts by which the plow-plates are secured to the standard or frame C. The part of the front bar of the standard-frame C upon which the seats D rest is also slotted, to allow the bolts to be arranged as the kind of plow-plate to be attached may render most convenient. The inner ends of the said bolts may be held securely in place by a short bar having various holes formed through it for the passage of the bolts. The seats D are made of various kinds. Some are so formed as to hold the plow-plates squarely, and are used for holding the cotton-sweep E, the shovel-plow F, bull tongue plow G, and other similar plows. Other seats D are made thicker upon one side than upon the other, to hold the plow-plate in an inclined position. These are used when the cotton-scraper H is used, or when other inclined or turn plow-plates are to be used, a set of seats, D, thus enabling any desired plow-plate to be used upon the same standard-frame by simply changing the seat D at the same time that the plow-plate is changed. The plow-plates are secured to the standard by the same bolts by which the seats D are secured to said standard, which said bolts, when inclined plow-plates are used, require to be bent near their heads, so as to hold the said plow-plates securely and firmly to their seat.

I is a circular cutter, which revolves upon a spindle secured to a slotted lug or arm, $c^2$, by a nut, as shown in Fig. 1, so that it may be adjusted as required. The circular cutter I is designed to project beneath the base of the plow, as shown in Fig. 1, to keep the plow squarely up to its work.

Having thus described my invention, I claim as new and desire to secure by Letters Patent—

1. The adjustable exchangeable seats D, constructed and arranged substantially as herein shown and described, in combination with the standard C and with the plow-plates E F G H, or either of them, as and for the purpose set forth.

2. The combination of the circular adjustable cutter I with the skeleton standard-frame C, when used in connection with the seats D and plow-plates E F G H, or either of them, substantially as herein shown and described, and for the purpose set forth.

EDWD. WIARD.

Witnesses:
SAML. L. AVERY,
H. T. HANFORD.